A. G. HANSEN.
AUTO WHEEL SHOE.
APPLICATION FILED OCT. 22, 1918.
1,381,826.
Patented June 14, 1921.
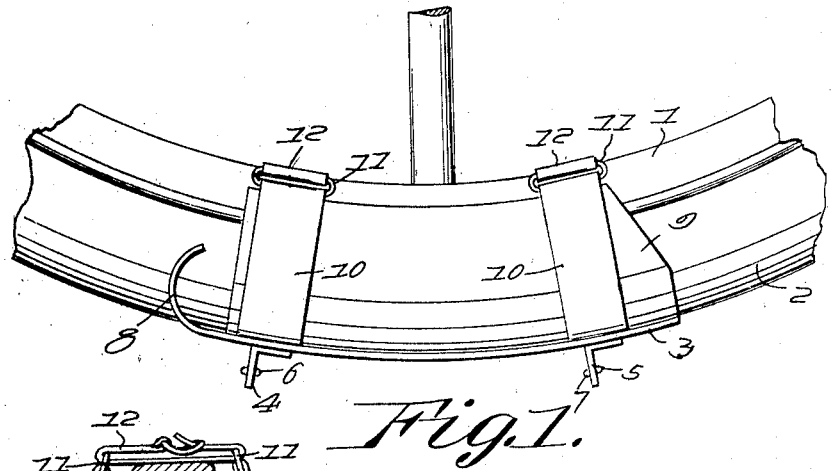
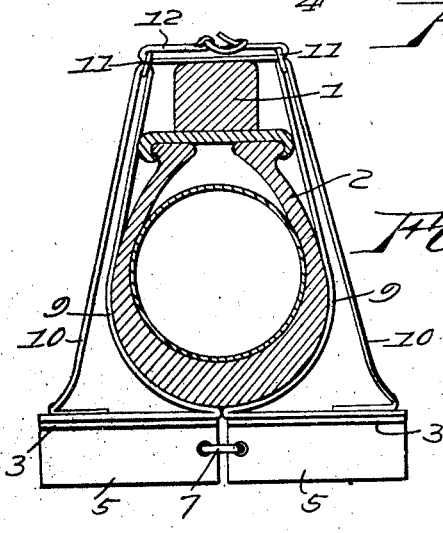
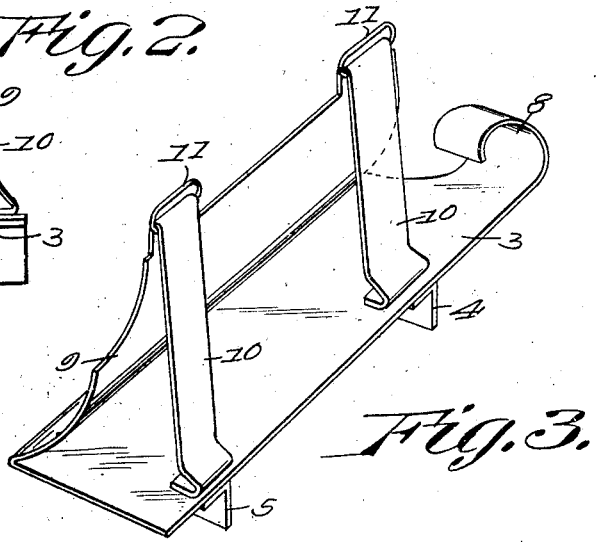
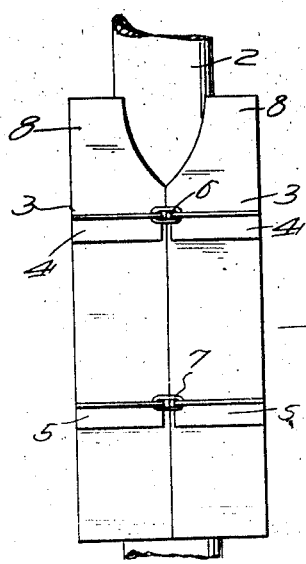
Inventor
Anton G. Hansen,

UNITED STATES PATENT OFFICE.

ANTON G. HANSEN, OF BOELUS, NEBRASKA.

AUTO-WHEEL SHOE.

1,381,826.  Specification of Letters Patent.  Patented June 14, 1921.

Application filed October 22, 1918. Serial No. 259,186.

*To all whom it may concern:*

Be it known that I, ANTON G. HANSEN, a citizen of the United States of America, residing at Boelus, in the county of Howard and State of Nebraska, have invented new and useful Improvements in Auto-Wheel Shoes, of which the following is a specification.

Primarily the invention seeks the provision of a detachable shoe for auto vehicle wheels, which, when attached to such wheels, will make it possible for them to exert a tractive effort in sand, muddy places and the like. To accomplish this purpose the shoe is formed so as to comprise two elements hingedly or swingingly connected together, and this shoe is attachable to a vehicle wheel by means of suitable straps which engage the inner edge of the felly and engage also eyes formed on the two elements of the shoe.

The invention further seeks the provision of a device of the above mentioned character which is simple in construction, durable and effective in operation and inexpensive to manufacture.

Still further and other objects will appear in the following description wherein the invention is set forth in detail.

In the accompanying drawings:

Figure 1 is a view in side elevation of a portion of an auto vehicle wheel showing the improved shoe attached thereto.

Fig. 2 is a view in end elevation of the improved shoe but showing in section the felly and tire of the wheel to which it is attached.

Fig. 3 is a perspective view of one of the complemental elements comprising the shoe.

Fig. 4 is a bottom plan view of the shoe.

Referring to the drawings, there is shown a portion of an auto vehicle wheel having the felly 1, the tire 2 and the attendant parts necessary to secure the tire to the felly. The improved shoe comprises two plates 3 made preferably of flat metal stock. Each of these plates is provided with transverse members 4 and 5 constituting traction lugs. The two plate members are hingedly or swingingly connected together by means of links 6 and 7, the former connecting the two lugs 4 and the latter the two lugs 5, each of these lugs being formed with an appropriate hole so that the lug may loosely engage with its attendant link.

The plates at one end have the shield portions 8 formed by effecting a graceful curve in the stock as shown.

Further than the shield portions 8, the plates 3 are formed with flange portions 9 on the longitudinal edges at which the plates are pivotally or swingingly connected together and these flange portions are shaped to conform to the contour of the side of the tire and tread of the latter against which they lie. As means for strengthening the structure comprising the plate 3 and its flange, there are provided the strengthening plates 10 which are secured to the plates 3 adjacent their outer or free longitudinal edges and which integrally connect with the upper or free edges of the flange portions 9.

Oval shaped eyes 11 are carried by each of the elements comprising the shoe and these eyes are attached, as shown, to the plates 10 adjacent their point of connection with the flange 9.

Straps 12 pass through the eye 11 and across the inner edge of the felly 1 serving to secure the shoe in place.

It is obvious that when the straps 12 are loosened, the shoe may be easily removed from the wheel, since the link connections between the two elements of the shoe will permit the swinging outward of the lateral flange 9, so that demounting of the shoe may be easily made. On applying the shoe to the wheel the reverse of this operation is of course performed, the peculiar construction of the shoe rendering the operation of placing it on the wheel comparatively easy.

In the use of the device, it is thought that one shoe on each driving wheel will be sufficient to carry an auto vehicle out of any sand or mud in which it may find itself. The device being attached so that the shield portions 8 lead when the shoe is approaching the ground, the shield portions 8 impact with the sand or mud and serve to give the wheel a tractive effort as well as to keep the mud or sand from accumulating on the plates 3 on the faces opposite the traction lugs 4 and 5. Of course two shoes on a wheel would be more effective than one alone and, in case of extereme necessity, two shoes may be applied to each driving wheel when they should be affixed at diametrically opposite points of the latter.

The invention having been described, what is claimed as new and useful is:

A shoe of the character described comprising a pair of longitudinal plate elements having traction lugs on one face, means swingingly connecting the plate elements together at one longitudinal edge, each plate being formed with a lateral flange portion on the edge at which it connects with the other plate, the flange portion being formed with a pair of spaced strengthening plates which connect with the first said plate adjacent the edge opposite the flange, and means for attaching the device on an auto vehicle tire at a specified point to shroud the tire at that point for the purpose herein specified.

In testimony whereof I affix my signature.

ANTON G. HANSEN.